(12) United States Patent
Burjes et al.

(10) Patent No.: US 7,322,103 B2
(45) Date of Patent: Jan. 29, 2008

(54) METHOD OF MAKING A MOTOR/GENERATOR COOLING JACKET

(75) Inventors: Roger Wayne Burjes, Independence, KS (US); Daryl Travis Brown, Neodesha, KS (US)

(73) Assignee: Deere & Company, Moline, IL (US)

( * ) Notice: Subject to any disclaimer, the term of this patent is extended or adjusted under 35 U.S.C. 154(b) by 531 days.

(21) Appl. No.: 10/860,847

(22) Filed: Jun. 4, 2004

(65) Prior Publication Data

US 2005/0268464 A1    Dec. 8, 2005

(51) Int. Cl.
*B21D 53/06* (2006.01)
(52) U.S. Cl. .................................. 29/890.035
(58) Field of Classification Search .............. 310/54, 310/58, 59, 60, 89, 52; 165/46–48, 51, 5, 165/164, 165, 51.5; 29/890.03, 89.035
See application file for complete search history.

(56) References Cited

U.S. PATENT DOCUMENTS

| | | | | |
|---|---|---|---|---|
| 2,862,120 A | 11/1958 | Onsrud | | 310/54 |
| 3,430,085 A * | 2/1969 | Mains | | 310/54 |
| 4,516,044 A * | 5/1985 | Bone | | 310/64 |
| 4,854,373 A * | 8/1989 | Williams | | 165/46 |
| 5,592,039 A | 1/1997 | Guardiani | | 310/113 |
| 5,798,587 A * | 8/1998 | Lee | | 310/58 |
| 5,859,482 A | 1/1999 | Crowell et al. | | 310/58 |
| 5,906,236 A | 5/1999 | Adams et al. | | 165/46 |
| 5,939,808 A * | 8/1999 | Adames | | 310/89 |
| 5,997,261 A | 12/1999 | Kershaw et al. | | 417/366 |
| 6,133,659 A | 10/2000 | Rao | | 310/89 |
| 6,300,693 B1 * | 10/2001 | Poag et al. | | 310/54 |
| 6,909,210 B1 * | 6/2005 | Bostwick | | 310/52 |

* cited by examiner

*Primary Examiner*—John C. Hong

(57) ABSTRACT

A cooling jacket assembly is made for an electric motor or generator. A hollow cylindrical housing is cast with an outer peripheral surface and an annular axially facing end surface, a plurality of grooves formed in the outer peripheral surface and a radial lip at one end. The outer peripheral surface is machined into a smooth surface having a uniform diameter. Inlet and outlet ports are drilled through the end surface to communicate with the grooves. A pair of sealing recesses are formed in the outer peripheral surface on opposite sides of the grooves, and an O-ring seal is placed in each recess. A cylindrical sleeve is slid over the outer peripheral surface of the housing until it engages the lip and so that the sleeve slidably engages the outer peripheral surface and sealing engages the seals.

5 Claims, 2 Drawing Sheets

METHOD OF MAKING A MOTOR/GENERATOR COOLING JACKET

BACKGROUND

The present invention relates to a method of making a cooling jacket for an electrical machine such as an electric motor or generator.

Electric motors and generators, such as a brushless permanent magnet motor, generate considerable heat and must include a cooling system. U.S. Pat. No. 5,859,482, issued 12 Jan. 1999 to Crowell et al., describes a cooling system wherein a cooling fluid is circulated through a cooling jacket which engages and conducts heat away from the stator of the machine. The cooling jacket includes a stator frame which is cast around cooling conduits. Another cooling jacket assembly for cooling an electric motor or generator is described in U.S. Pat. No. 6,300,693, issued 9 Oct. 2001 to Poag et al. U.S. Pat. No. 4,516,044 describes an electric motor heat exchange apparatus wherein cooling passages are formed in an internal surface of a hollow cylindrical housing. It is also known to drill axially extending cooling passages in a motor housing. These prior systems are expensive or difficult to manufacture, or have other disadvantages.

SUMMARY

Accordingly, an object of this invention is to provide a method of making a cooling jacket which is simple and inexpensive.

These and other objects are achieved by the present invention, wherein a cooling jacket assembly is made by the following steps: A hollow cylindrical housing is cast with an outer peripheral surface and an annular axially facing end surface, a plurality of grooves formed in the outer peripheral surface and a radial lip at one end. The outer peripheral surface is machined into a smooth surface having a uniform diameter. Inlet and outlet ports are drilled through the end surface to communicate with the grooves. A pair of sealing recesses are formed in the outer peripheral surface on opposite sides of the grooves, and an O-ring seal is placed in each recess. A cylindrical sleeve is slid over the outer peripheral surface of the housing until it engages the lip and so that the sleeve slidably engages the outer peripheral surface and sealing engages the seals. Three of these housings may enclose an electric generator and a pair of wheel drive motors and form parts of a transaxle housing in an hybrid electric drive vehicle.

DETAILED DESCRIPTION

Figure 1:
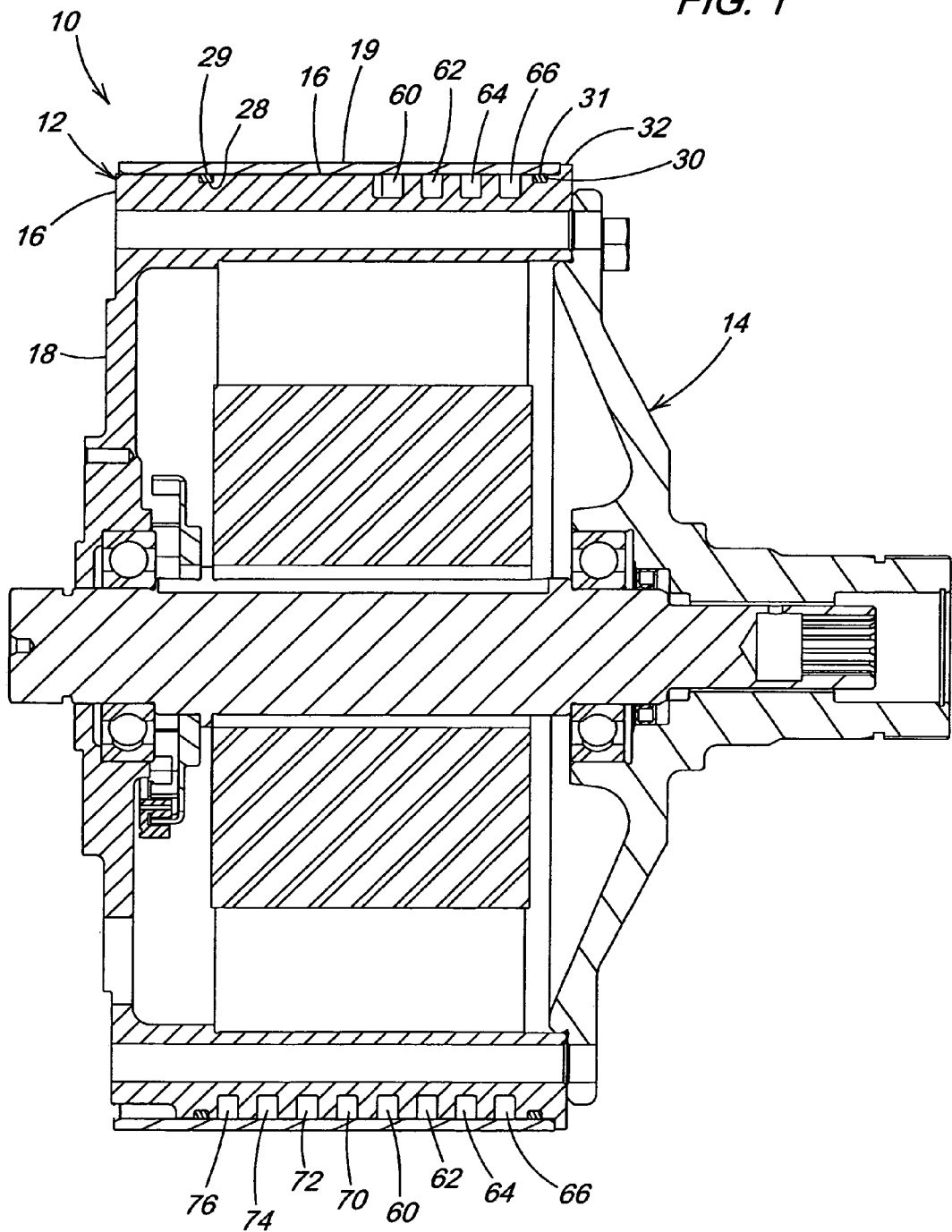
FIG. 1 is a simplified sectional view of a motor including a cooling jacket assembly made according to the present invention.
Figure 2:
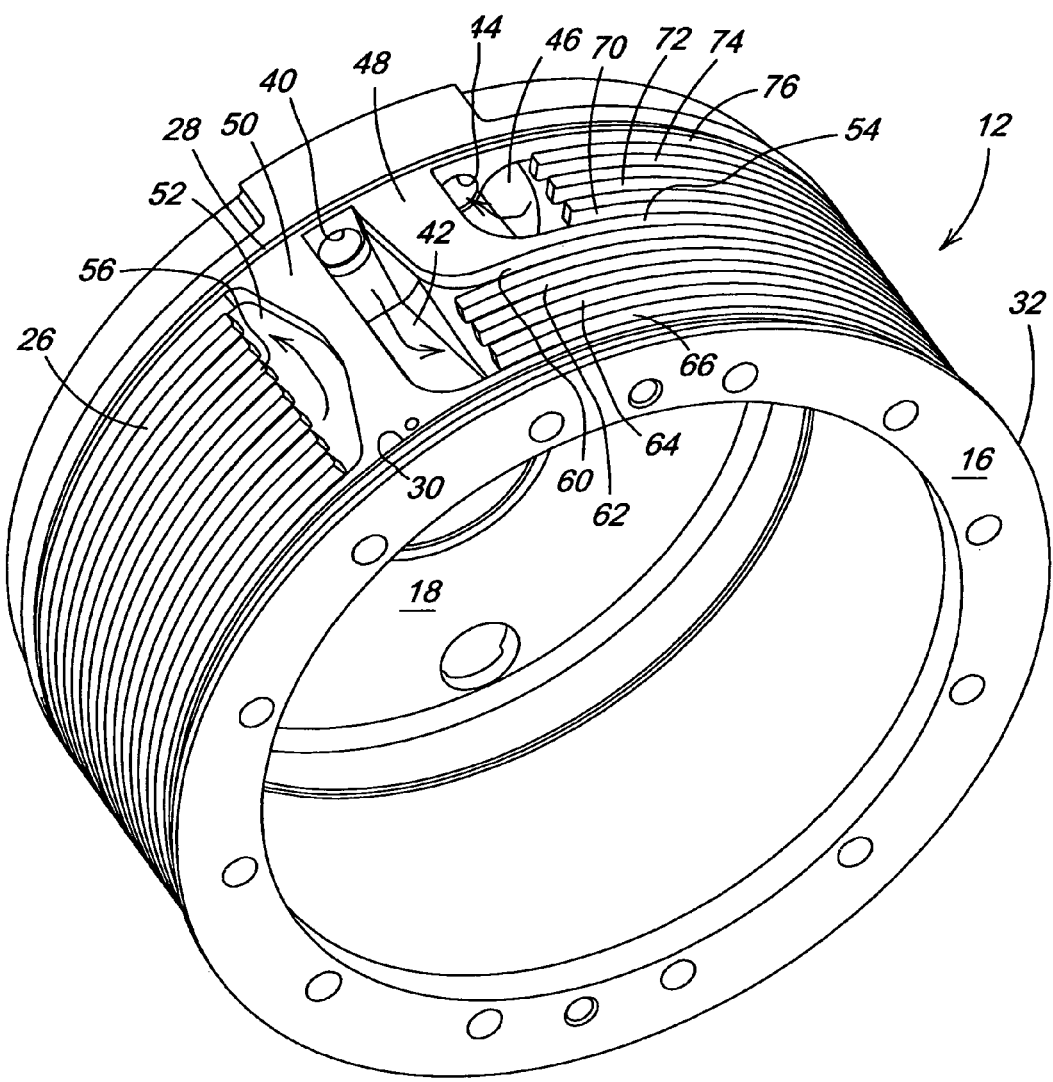
FIG. 2 is a perspective view of the motor housing of FIG. 1.

Referring to FIGS. 1 and 2, a housing 12 and a front cover or spindle 14 enclose an electric motor or generator 10. Housing 12 includes a hollow cylindrical portion 16 and an annular end wall 18. End wall 18 and spindle 14 both have bores which receive conventional bearings 20, 22 which rotatably support a motor shaft 24. The housing 12 and spindle 14 enclose a conventional electric motor or generator stator 15 and rotor 17. A plurality of annular coolant grooves 26 are formed in the outer surface of cylinder portion 16. A pair of annular seal slots 28, 30 are formed in the outer surface of cylinder portion 16 near the ends thereof and on opposite sides of the grooves 26. Cylinder portion 16 also forms an annular lip 32 which projects radially outwardly from one end thereof. A relatively thin walled cylindrical sleeve 19 is mounted on the outer surface of cylinder portion 16 with an end engaging the lip 32.

As best seen in FIG. 2, an inlet port 40 extends through wall 18 and into an inlet chamber 42. An outlet port 44 extends through wall 18 and into an outlet chamber 46. A divider wall 48 separates inlet port 40 and inlet chamber 42 from outlet port 44 and outlet chamber 46. An axially extending wall 50 separates inlet chamber 42 from a return chamber 52. A divider fin 54 is connected to divider wall 48 and extends from wall 48 to an end 56 which is adjacent to chamber 52 and spaced apart from wall 50. A first set of grooves 60, 62, 64, 66 on one side of fin 54 extend around the periphery of cylinder portion 16 and communicate inlet chamber 42 with return chamber 52. A second set of grooves 70, 72, 74, 76 on the other side of fin 54 extend around the periphery of cylinder portion 16 and communicate return chamber 52 with outlet chamber 46. Each pair of adjacent grooves is separated by a corresponding rib or fin.

The housing 12 is preferably aluminum die cast with detailed slots 60-66 and 70-76, walls and ribs, and with rough interior and exterior features, including chambers 40, 42 and 52. The ports 40 and 44 and the seal slots 28, 30 are then machined. The outer surfaces of the walls and ribs of the cylindrical portion 16 are machined so that they form portions of a smooth cylindrical surface with a uniform diameter.

O-ring seals 29, 31, respectively, are then mounted in seal slots 28 and 30. Finally, sleeve 19 is slid over the outer surface of cylinder portion 16 until its end engages the lip 32 and so that it sealingly engages the O-ring seals 29, 31. The sleeve 19 thereby isolates the various grooves and chambers from the exterior environment and from each other, except as they are communicated with each other via chambers 42, 46 and 52. This results in a motor cooling assembly or system which is simple and inexpensive to manufacture.

In use, coolant flows through the inlet 40 of the jacket where chamber 42 directs the stream of coolant into grooves 60-66. Coolant flows clockwise viewing FIG. 2 through grooves 60-66 to chamber 52 which directs the coolant into grooves 70-76. Coolant flows counter-clockwise through grooves 70-76 to chamber 46 and to outlet 44.

The method of making described herein can be used to for motor cooling jackets for the generator and motors of a transaxle assembly for hybrid electric drive vehicle (not shown). The cooling jacket design described above could be modified to have different numbers and arrangements of flow channels, fins and dividers to provide for serpentine flow through the jacket. For example, each flow path could have more or less parallel sections than the number of sections shown. Further, the inlet and outlet points could be varied to vary the number of serpentine flow paths. For example, there could be one, two or more serpentine flow paths. The particular arrangement used for a given application will depend on size, heat transfer requirements, and possibly other factors.

While the present invention has been described in conjunction with a specific embodiment, it is understood that many alternatives, modifications and variations will be apparent to those skilled in the art in light of the foregoing description. For example, the cooling jacket could be modified to have different numbers and arrangements of grooves, fins and walls to provide for different flow paths through the jacket. The particular arrangement used for a given application will depend on size, heat transfer requirements, and possibly other factors. Accordingly, this invention is intended to embrace all such alternatives, modifications and variations which fall within the spirit and scope of the appended claims.

We claim:

1. A method of making a cooling jacket assembly for an electric machine, comprising the following steps:

forming a hollow cylindrical housing having an outer peripheral surface and an annular axially facing end surface, and having a plurality of grooves formed in the outer peripheral surface;

forming an inlet port in the housing, said inlet port extending through the end surface and communicating with a first portion of the grooves;

forming an outlet port in the housing, said outlet port extending through the end surface and communicating with a second portion of the grooves;

forming a pair of sealing recesses in the outer peripheral surface, said recesses being spaced apart on opposite sides of the grooves;

placing a seal in each of the sealing recesses;

forming the housing with a lip projecting radially from one end thereof, the lip forming an axially facing annular abutment surface; and sliding a cylindrical sleeve over the outer peripheral surface of the housing so that the sleeve slidably engages the outer peripheral surface, engages the abutment surface of the lip and sealingly engages the seals.

2. The method of claim 1, further comprising:

machining the outer peripheral surface into a smooth surface having a uniform diameter.

3. The method of claim 1, further comprising:

forming the housing with wall separating the first and second groove portions from each other.

4. The method of claim 1, further comprising:

forming the housing with an axially extending wall separating the inlet and outlet ports from each other.

5. The method of claim 1, wherein:

forming the housing with a plurality of annular grooves separated by annular ribs, with an inlet chamber communicated with one end of the grooves, with an outlet chamber communicated with a second end of the grooves, and with an axially extending wall separating the inlet and outlet chambers from each other.

* * * * *